US010189434B1

(12) United States Patent
Casaburo et al.

(10) Patent No.: US 10,189,434 B1
(45) Date of Patent: Jan. 29, 2019

(54) AUGMENTED SAFETY RESTRAINT

(71) Applicants: Daniele Casaburo, Cupertino, CA (US); Daniel Kurz, San Francisco, CA (US); Sebastian Knorr, Mountain View, CA (US)

(72) Inventors: Daniele Casaburo, Cupertino, CA (US); Daniel Kurz, San Francisco, CA (US); Sebastian Knorr, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/269,025

(22) Filed: Sep. 19, 2016

Related U.S. Application Data

(60) Provisional application No. 62/233,714, filed on Sep. 28, 2015.

(51) Int. Cl.
B60R 22/00 (2006.01)
B60R 22/48 (2006.01)
B60Q 9/00 (2006.01)
B60Q 3/02 (2006.01)

(52) U.S. Cl.
CPC ............ B60R 22/00 (2013.01); B60Q 3/02 (2013.01); B60Q 9/00 (2013.01); B60R 22/48 (2013.01); B60R 2022/4808 (2013.01); B60R 2022/4866 (2013.01)

(58) Field of Classification Search
CPC ...... B60R 21/01512; B60R 22/00; B60Q 9/00
See application file for complete search history.

(56) References Cited

U.S. PATENT DOCUMENTS

| 6,278,362 | B1* | 8/2001 | Yoshikawa | B60K 28/06 340/438 |
|---|---|---|---|---|
| D489,890 | S | 5/2004 | Gorham, Jr. | |
| 7,576,642 | B2* | 8/2009 | Rodemer | A61B 5/02438 280/735 |
| D697,305 | S | 1/2014 | Culver | |
| 8,698,639 | B2 | 4/2014 | Fung et al. | |
| 9,646,439 | B2* | 5/2017 | Ricci | G07C 9/00158 |
| 9,751,534 | B2* | 9/2017 | Fung | G06F 19/345 |
| 2007/0108755 | A1 | 5/2007 | Jones | |
| 2008/0036187 | A1* | 2/2008 | Breed | B60R 21/01516 280/735 |
| 2009/0231145 | A1 | 9/2009 | Wada et al. | |
| 2014/0309874 | A1* | 10/2014 | Ricci | G06F 21/31 701/36 |
| 2015/0203030 | A1* | 7/2015 | Knobl | B60Q 9/00 340/438 |

(Continued)

OTHER PUBLICATIONS

Martinez, Helios De Rosario, et al; "Heart and Respiration Unobtrusive Sensors Integrated in the Vehicle", Harken, Date Unknown, Downloaded Sep. 19, 2016, 8 pp.

(Continued)

Primary Examiner — Nicole T Verley
(74) Attorney, Agent, or Firm — Young Basile Hanlon & MacFarlane, P.C.

(57) ABSTRACT

An augmented safety restraint system includes a first restraint operable to secure a first passenger. The first restraint has an exposed surface facing away from a body of the first passenger. A gesture-sensing device is disposed on the exposed surface of the first restraint and is operable to receive an input from the first passenger.

20 Claims, 7 Drawing Sheets

(56) References Cited

U.S. PATENT DOCUMENTS

| | | | | |
|---|---|---|---|---|
| 2016/0068103 | A1* | 3/2016 | McNew | B60Q 9/00 |
| | | | | 701/23 |
| 2016/0207454 | A1* | 7/2016 | Cuddihy | B60Q 9/00 |
| 2016/0244011 | A1* | 8/2016 | Ricci | G06F 17/3056 |
| 2016/0250985 | A1* | 9/2016 | Ricci | B60R 16/0373 |
| | | | | 701/48 |
| 2016/0318468 | A1* | 11/2016 | Ricci | B60R 16/037 |
| 2016/0332568 | A1* | 11/2016 | Kim | B60Q 1/50 |
| 2017/0096145 | A1* | 4/2017 | Bahn | E05F 15/70 |
| 2017/0247000 | A1* | 8/2017 | Ricci | G06K 9/00302 |
| 2017/0249095 | A1* | 8/2017 | Ricci | G06F 3/0622 |

OTHER PUBLICATIONS

Hamdani, Syed Talha Ali et. al.; "The Application of a Piezo-Resistive Cardiorespiratory Sensor System in an Automobile Safety Belt", Sensors 2015, ISSN 1424-8220, www.mdpi.com/journal/sensors, Mar. 30, 2015, 12 pp.

Amazon.Com, "fitTek Running Belt Waist Pack Fanny Pack Pouch", Downloaded Oct. 9, 2017, https://www.amazon.com/Running-fitTek-iPhone-Runners-Workout/dp/B01HTIFHGM, 8 pp.

\* cited by examiner

AUGMENTED SAFETY RESTRAINT

CROSS-REFERENCE TO RELATED APPLICATIONS

This application claims the benefit of U.S. Provisional Application No. 62/233,714, which was filed on Sep. 28, 2015.

FIELD

The application relates generally to safety restraints. More particularly, described embodiments relate to augmented safety restraints configured to allow secured passengers to interact both with the vehicle and with each other using the augmented safety restraints.

BACKGROUND

In the automotive field, recent vehicle designs have implemented features intended to enhance the experience of drivers and passengers. As an example, on-board entertainment systems have evolved from simple radio receivers to sophisticated multi-function devices that include navigation functions, multimedia file playback functions, video display functions, and telephone communication functions. As another example, comfort amenities available in some vehicles include heated seats, cooled seats, and seats with massaging capabilities.

Future developments, such as autonomous driving modes, will further increase user demand for an enhanced in-vehicle experience. As an example, autonomous driving functions are in the early stages of user adoption. Upon development and adoption of fully autonomous driving modes, users will be able to treat travel time as leisure time, and participate in leisure activities such as communicating with other persons or consuming media content.

SUMMARY

One aspect of the disclosed embodiments is an augmented safety restraint system that includes a first restraint operable to secure a first passenger. The first restraint has an exposed surface facing away from a body of the first passenger. A gesture-sensing device is disposed on the exposed surface of the first restraint and is operable to receive an input from the first passenger.

Another aspect of the disclosed embodiments is an augmented safety restraint operable to secure a passenger. The augmented safety restraint includes a passenger securing structure and a display device connected to the passenger securing structure and operable to display visual content in response to an input signal.

Another aspect of the disclosed embodiments is an augmented safety restraint that includes a restraint structure operable to secure a passenger. The restraint structure has a surface. An energy-producing device is disposed on the surface. The energy-producing device generates electrical energy. An electronic device is connected to the restraint structure and receives the electrical energy from the energy-producing device.

DETAILED DESCRIPTION

International laws for driving safety require every passenger within a vehicle to use a safety restraint to secure the passenger to a seat allotted for single passenger use. The ubiquity of safety restraints makes them an ideal candidate for enhancement, to provide safety features, vehicle interaction capabilities, communication capabilities, entertainment functions, and comfort-enhancing functions.

An augmented safety restraint may be configured to: secure the passenger within the vehicle; provide holistic monitoring of passenger status; supply entertainment and comfort; allow communication or interaction between the passenger, vehicle, and other passengers within the vehicle; and generate power sufficient to run the aforementioned capabilities. These features allow for enhancement of passenger activities, improved interaction with the vehicle and/or other passengers, and energetic autonomy while at the same time meeting regulatory safety requirements.

Figure 1:
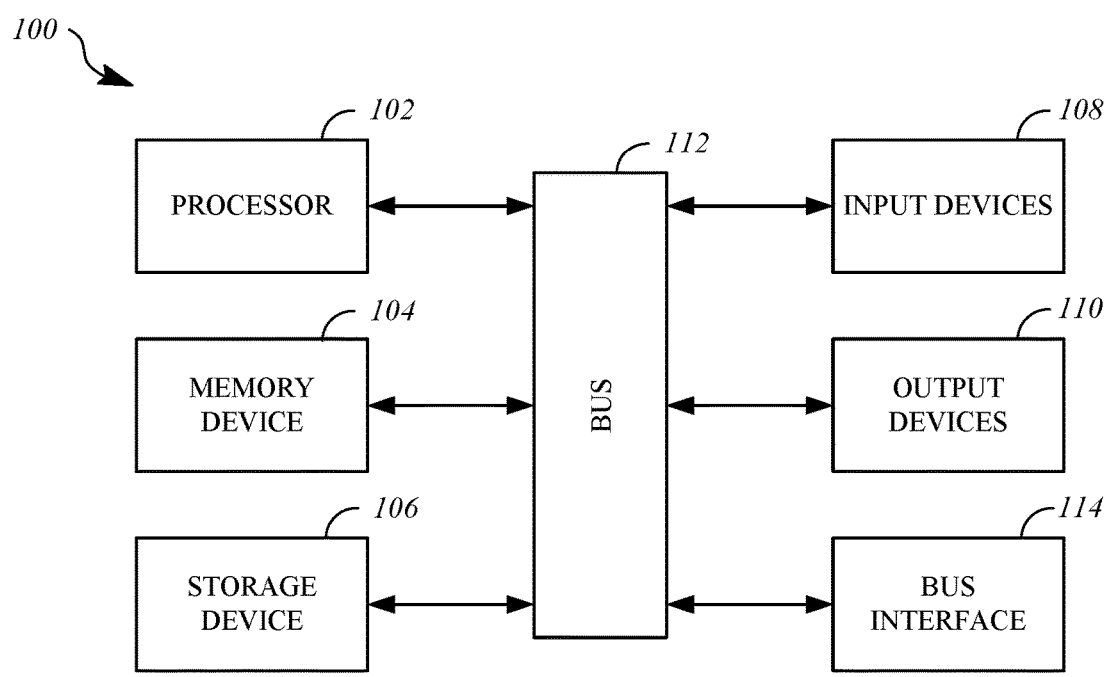
FIG. 1 is a block diagram showing an example of a computing device.

FIG. 1 shows an example of a computing device 100 that can be used with the augmented safety restraints described herein. The computing device 100 can be a single computing device, housed, for example, in a vehicle head unit, or be a separate device such as a desktop computer, a laptop computer, a tablet, or a mobile telephone. Alternatively, the computing device 100 can be a system that includes multiple computing devices working cooperatively.

In the illustrated example, the computing device 100 includes a processor 102, a memory device 104, a storage device 106, one or more input devices 108, and one or more output devices 110, which are interconnected by a bus 112. The computing device 100 can also include a bus interface 114 for connecting peripheral devices to the bus 112. In some embodiments, the bus interface 114 may be connected to communications hardware for connecting to a wireless network, e.g., GSM, UMTS, and LTE, to allow communication with an external server or a cloud service.

The processor 102 can be any type of device that is able to process or manipulate information, including devices that are currently known and devices that may be developed in the future. As an example, the processor 102 can be a conventional central processing unit (CPU). Although the illustrated example shows a single processor, multiple processors can be utilized instead of a single processor.

The memory device 104 is utilized to store information for immediate use by the processor 102. The memory device 104 includes either or both of a random access memory (RAM) device and a read only memory (ROM) device. The memory device 104 can be utilized to store information, such as program instructions that can be executed by the processor 102, and data that is stored by and retrieved by the processor 102. In addition, portions of the operating system of the computing device 100 and other applications that are being executed by the computing device 100 can be stored by the memory device during operation of the computing device 100.

The storage device 106 is utilized to store large amounts of data persistently. As examples, the storage device 106 can be a hard disk drive or a solid-state drive.

The input devices 108 can include any type of device that is operable to generate computer interpretable signals or data in response to user interaction with the computing device 100, such as physical interaction, verbal interaction, or non-contacting gestural interaction. As examples, the input devices 108 can include one or more of a keyboard, a mouse, a touch-sensitive panel with or without an associated display, a trackball, a stylus, a microphone, a camera, or a three-dimensional motion capture device. The input devices 108 can also include any type of device that is operable to transfer computer interpretable signals or data to the computing device 100, such as sensors or mobile devices.

The output devices 110 can include any type of device that is able to relay information in a manner that can be perceived by a user or utilized by another device. As examples, the output devices 110 can include one or more of an LCD display screen, an LED display screen, a CRT display screen, a printer, an audio output device such as a speaker, a haptic output device, a data port such as a USB or HDMI connector, etc. In some implementations, the output devices 110 include a display screen and the input devices 108 include a touch sensitive panel that is integrated into the display screen to define a touch-sensitive display screen.

The bus 112 can transfer signals and/or data between the components of the computing device 100. Although depicted as a single bus, it should be understood that multiple or varying types of buses can be utilized to interconnect the components of the computing device 100. The bus interface 114 can be any type of device that allows other devices, whether internal or external, to connect to the bus 112.

Figure 2:
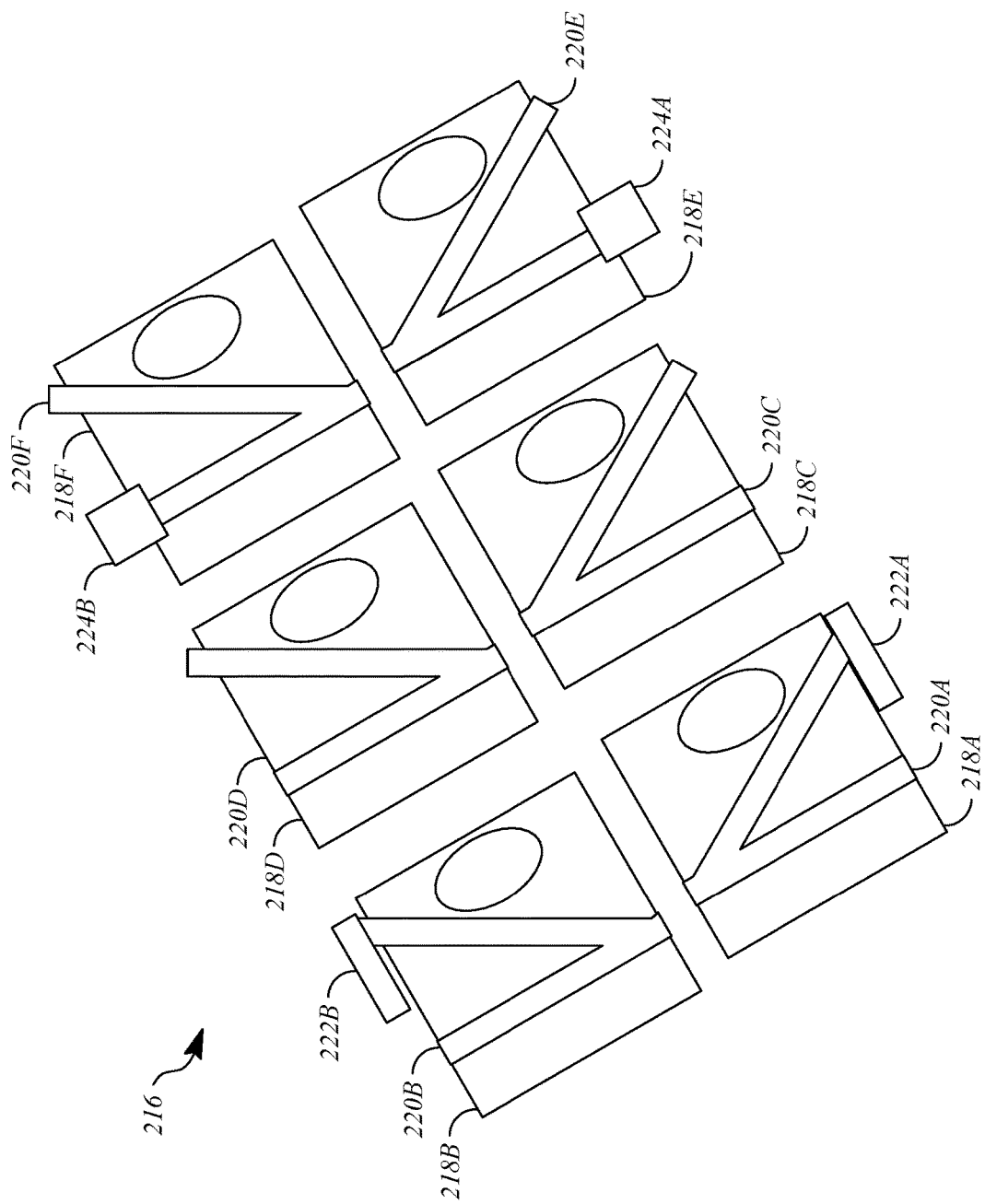
FIG. 2 is a block diagram showing a first example of a vehicle seating schematic with use positions for a plurality of seats and augmented safety restraints.

FIG. 2 shows a first example of a vehicle seating schematic 216 with use positions for a plurality of seats and augmented safety restraints. In this example, six passenger seats 218A-F are shown as populating three vehicle seating rows with traditional side-by-side two-seat sets (e.g., 218A-B, 218C-D, and 218E-F) in each of the three vehicle seating rows. In the front vehicle seating row, two augmented safety restraints 220A-B are shown as including integrated side airbags 222A-B, the integrated side airbags 222A-B being traditionally housed within or proximate to a b-pillar of the vehicle (not shown). The four remaining augmented safety restraints 220C-F are distributed one per seat 218C-F along the second two vehicle rows. Each of the augmented safety restraints 220A-F is shown in a use position, though the associated passengers secured by the augmented safety restraints 220A-F are not shown in FIG. 2 for clarity.

Any or all of the augmented safety restraints 220A-F may include a side airbag. A pair of pre-tensioner devices 224A-B is also shown in conjunction with the augmented safety restraints 220E-F, though it is understood that any or all of the augmented safety restraints 220A-F can include a pre-tensioner device.

Each of the augmented safety restraints 220A-F includes a restraint structure, which is a passenger securing structure such as a belt or a harness, that is secured to the vehicle or to the passenger seats 218A-F, and has a passenger-facing surface that is able to engage the body of a passenger to restrain motion of the passenger relative to the respective one of the passenger seats 218A-F. Each of the augmented safety restraints 220A-F includes one or more attached or embedded devices, referred to herein as augmentations, which may be located on an exposed surface of each of the augmented safety restraints 220A-F or located within each of the augmented safety restraints 220A-F.

In the illustrated example, each of the augmented safety restraints 220A-F includes a three-point safety belt that has a lower belt portion (i.e., a lap belt portion) configured to cross the lap of the respective secured passenger and an upper belt portion (i.e., a sash belt portion) configured to cross the chest of the secured passenger in a traditional manner. The augmentations discussed herein may be located on any portion of the augmented safety restraints 220A-F, such as the lower belt portion or the upper belt portion. Though the augmented safety restraints 220A-F shown here are common three-point seat belts, other restraint types (e.g., inflatable belts, webs, harnesses, etc.) are also possible.

Figure 3:
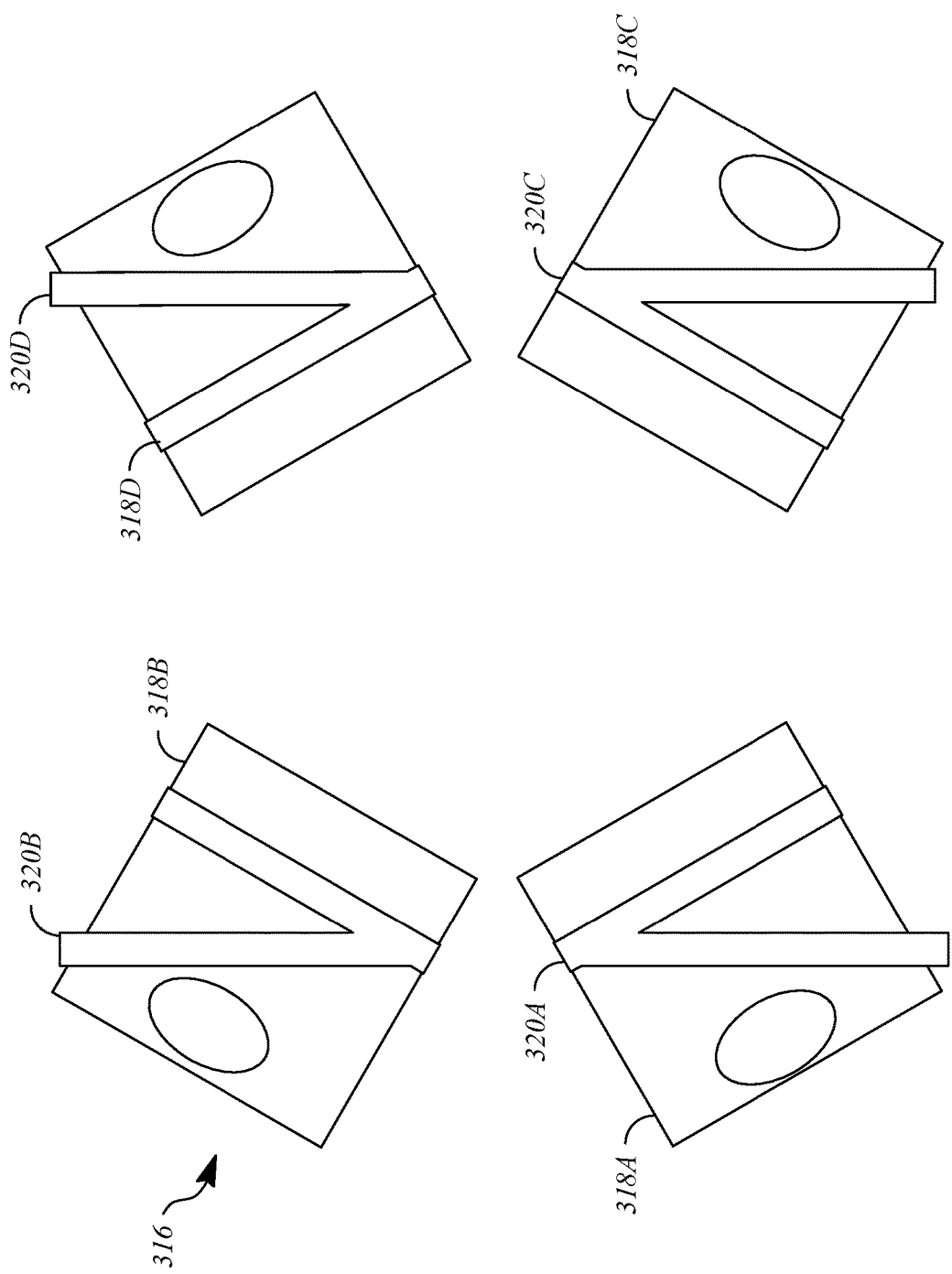
FIG. 3 is a block diagram showing a second example of a vehicle seating schematic with use positions for a plurality of seats and augmented safety restraints.

FIG. 3 shows a second example of a vehicle seating schematic 316 with use positions for a plurality of seats and augmented safety restraints. In this example, four passenger seats 318A-D are shown as populating two vehicle seating rows with traditional side-by-side two-seat sets (e.g., 318A-B, 318C-D) in each of the two vehicle seating rows. Augmented safety restraints 320A-D are distributed one per seat 318A-D along the two vehicle seating rows. In this vehicle seating schematic 316, the two front-row seats 318A, 318B are turned such that they face the two back-row seats 318C, 318D. Thus, the vehicle seating schematic 316 in FIG. 3 can be used, for example, in an autonomous vehicle or in a recreational vehicle, which may be towed by a manually-driven vehicle or an autonomously-driven vehicle.

Figure 4:
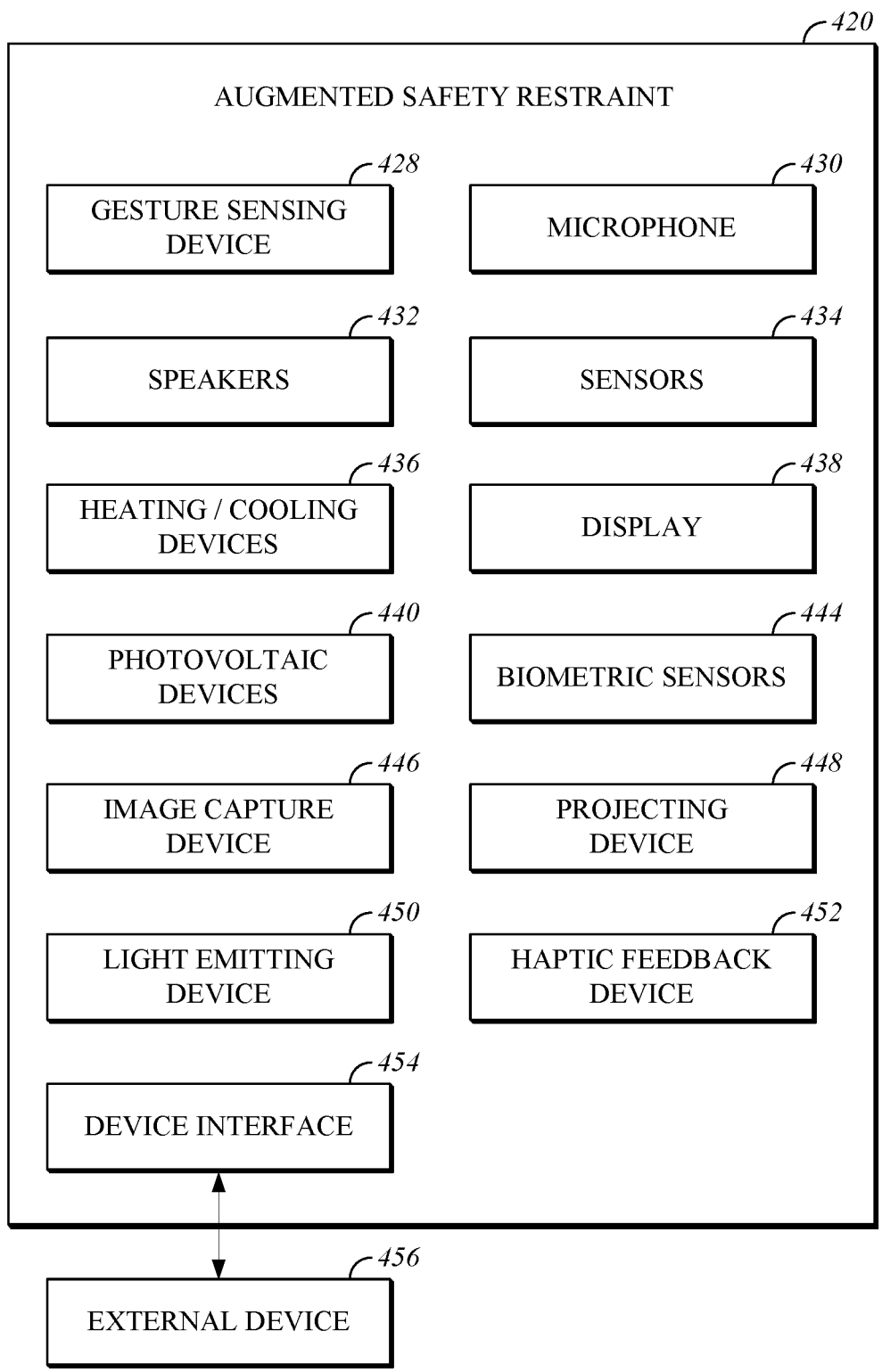
FIG. 4 is a block diagram showing an augmented safety restraint.

FIG. 4 is a block diagram that shows an augmented safety restraint 420, which can be utilized as the augmented safety restraints 220A-F of FIG. 2 or as the augmented safety restraints 320A-D of FIG. 3. The augmented safety restraint 420 includes one or more devices that are disposed within or on an exterior surface of the augmented safety restraint 420, and which provide additional or enhanced functionality to the augmented safety restraint 420. As examples, the augmented safety restraint 420 may include any or all of a gesture-sensing device 428, a microphone 430, speakers 432, sensors 434, heating/cooling devices 436, a display 438, photovoltaic devices 440, biometric sensors 444, an image capture device 446, a projecting device 448, a light emitting device 450, a haptic feedback device 452, and a device interface 454. The device interface 454 is operable to connect the augmented safety restraint 420 to an external device 456 by a wired connection or a wireless connection. The components of the augmented safety restraint 420 may communicate with one another and/or with the external device 456, such as by sending, receiving, and operating in response to commands.

The gesture-sensing device 428 can include a sensor with either contact or non-contact sensitive features that can be implemented using capacitive, optical, wave, force-based, or any other technology sufficient to detect a touch-based or gesture-based indication from the passenger.

The microphone 430 may be any manner of audio input device, and may be integrated into or located on the augmented safety restraint 420 at a single location or at multiple locations. The speaker 432 may be any manner of audio output device, and may be integrated into or located on the augmented safety restraint 420 at a single location or at multiple locations.

The sensors 434 may be any manner of sensing device that is operable to provide information representing a current state of the passengers or environment in the vehicle.

The heating/cooling device 436 is integrated into or located on the augmented safety restraint 420. As examples, the heating/cooling device 436 may be one or both of a heating device or a cooling device and may include, as examples, a resistive heater and/or a thermoelectric cooler.

The display 438 is integrated into and/or located on the augmented safety restraint 420 and is a display screen or display device of any type that is operable to output information in a visually perceptible form. The display 438 may receive an input signal, such as from other components of the augmented safety restraint 420 or from the external device 456, and display visual content such as a video, an image, a color, or illumination. As examples, the display 438 can be implemented by means of LED, liquid crystal, plasma panels, or an OLED layer applied to the exposed surface of the augmented safety restraint 420, or any other display devices that are currently known and display devices that may be developed in the future. In some implementations, the gesture-sensing device 428 is integrated into the display 438.

The photovoltaic devices 440 are operable to generate electrical energy when exposed to sunlight and may be used, for example, to provide electrical energy to other components of the augmented safety restraint 420.

The biometric sensors 444 may be utilized to identify a passenger or to control access to information or functions. As one example, the biometric sensors 444 may include a fingerprint recognition sensor. As another example, the biometric sensors 444 may include a camera in association with facial recognition functionality implemented in, for example, the computing device 100 of FIG. 1.

The image capture device 446 may be a still-image capture device (i.e., a camera) or a video capture device (i.e., a video camera). The image capture device 446 may be used, for example, as a sensor to measure properties of the passengers and/or the environment.

The projecting device 448 may be, as examples, a video projector or a controllable laser beam. The projecting device is operable to display an image on a surface within the vehicle, such as on a seatback surface or an interior trim panel.

The light emitting device 450 may be, as examples, an LED, a light bulb, or any other device that is currently known or may be developed in the future, that is operable to provide illumination to an area adjacent to the augmented safety restraint 420. The light emitting device 450 is integrated into or located on the augmented safety restraint 420, and may be used to illuminate an object that a passenger is holding, such as a book. Operation of the light emitting device 450 may be controlled by commands from other components of the augmented safety restraint 420. As an example, the gesture-sensing device 428 may be operable to switch the light emitting device 450 between on and off states, and may be operable to control the color and/or intensity of the light produced by the light emitting device 450.

The haptic feedback device 452 is operable to provide sensory information to the passenger. As an example, the haptic feedback device 452 may be a vibrating device such as a motor that is integrated into the augmented safety restraint 420. In one embodiment, the augmented safety restraint 420 may be augmented solely by incorporation of the haptic feedback device 452 and supporting hardware such as the computing device 100 of FIG. 1, with additional functionality provided by attached devices that are connected to the augmented safety restraint 420 using the device interface 454.

The device interface 454 allows communication with electrical devices that are separate from the augmented safety restraint 420, such as the external device 456. The device interface 454 may be any type of electrical connection that allows transmission of signals and/or data between the augmented safety restraint 420 and the external device 456. The device interface 454 may be a wired connection or a wireless connection.

The external device 456 is an electronic device that is separate from the augmented safety restraint 420 but is in electrical communication with one or more components that are integrated into the augmented safety restraint 420, for transfer of signals and/or data. In one embodiment, the external device 456 may be any of the devices described as augmentations that could be integrated into the augmented safety restraint 420. In this embodiment, one or more devices are connected to the augmented safety restraint 420 through the device interface 454 by a wired or wireless connection to the augmented safety restraint, instead of being integrated. Thus, as examples, the gesture-sensing device 428 or the sensors 434 could be in communication with the augmented safety restraint 420 through a wired or wireless connection, and may also be physically attached to the exterior of the augmented safety restraint 420, such as by a clip. In addition, the augmented safety restraint 420 may be augmented solely by incorporation of the device interface 454 and supporting hardware such as the computing device 100 of FIG. 1, with additional functionality being provided by attached devices that are connected to the augmented safety restraint 420 using the device interface 454.

In one embodiment, the external device 456 may be a computing device or communications device such as a mobile telephone, a tablet computer, a laptop computer, or a head-mounted display that is connected to the augmented safety restraint 420 through the device interface 454 by a wired connection or a wireless connection. The augmented safety restraint 420 may be configured to interact with the external device 456. As one example, components of the augmented safety restraint 420 may provide inputs to the external device 456, such as inputs provided by the gesture-sensing device 428, the microphone 430, the sensors 434, and the image capture device 446. Thus, the augmented safety restraint 420 may be used to control the external device 456. As another example, components of the augmented safety restraint 420 may be utilized as output devices by the external device 456, such as outputs provided by the speakers 432, the display 438, and the projecting device 448. Thus, components of the augmented safety restraint 420 may be utilized by and/or controlled by the external device 456.

Figure 5:
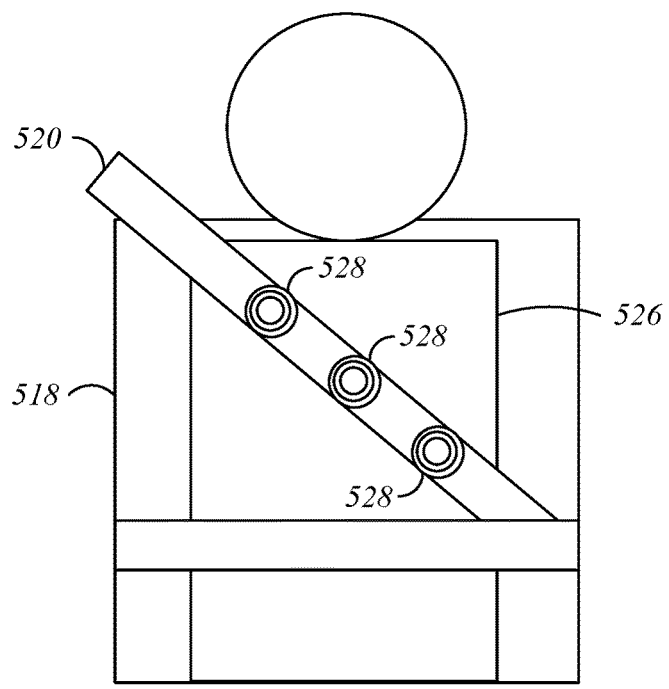
FIG. 5 shows a touch-based or haptic communication feature for an augmented safety restraint.

FIG. 5 shows a touch-based or haptic communication feature for an augmented safety restraint 520. The augmented safety restraint 520 is shown as securing a passenger 526 to a seat 518. The augmented safety restraint 520 can include touch and/or multi-touch capabilities that make it possible for the passenger 526 to interact with the vehicle. The passenger 526 can use touch to control aspects of the vehicle system, e.g., the climate control system, the windows, the volume of audio feedback, etc. The passenger 526 can also use touch to interact with other electronic devices within the vehicle, e.g., increasing the volume of a phone call, or answering or rejecting an incoming phone call. The passenger 526 can also use touch to promote interaction with other passengers in the vehicle. The touch/multi-touch capabilities described further below, in conjunction with the proximity of the augmented safety restraint 520 to the passenger's body, allow the passenger 526 to control vehicle features and communicate with other passengers that could otherwise be out-of-range of the secured passenger 526. The passenger 526 can also use touches or gestures to input a desired destination for a navigation system or for an autonomous vehicle control system. The passenger 526 can also use touches or gestures to control or interact with vehicle-connected devices, inside or outside the vehicle, physically or wirelessly connected, to perform functions such as answering or rejecting incoming phone calls, controlling a multimedia player or appliances of an automated home, e.g., the lighting, heating, ventilation, air conditioning appliances, and security of the automated home.

In the embodiment shown in FIG. 5, touch/multi-touch capabilities are introduced into the augmented safety restraint 520 by integrating a gesture-sensing device 528 into the material of the augmented safety restraint 520. The gesture-sensing device 528 can be accessible on only one surface or on both surfaces of the augmented safety restraint 520 (i.e., opposite surfaces such as the passenger-facing surface and the exposed surface). The augmented safety restraint 520 can also include multiple gesture-sensing devices 528, though only the gesture-sensing devices 528 located on the part of the augmented safety restraint 520 that faces the secured passenger 526 or that is exposed to the environment may be activated. The gesture-sensing device 528 can include a sensor with either contact or non-contact sensitive features that can be implemented using capacitive, optical, wave, force-based, or any other technology sufficient to detect a touch-based or gesture-based indication from the secured passenger 526 using gesture-sensing device 528 integrated with the augmented safety restraint 520.

For example, when the gesture-sensing device 528 uses force-based technology, the direction of the force acting on a touch point of the gesture-sensing device 528 can be inferred and used to provide differing instructions to various vehicle components through, for example, the computing device 100, based on the direction detected. In all of the above examples, the gesture-sensing device 528 can be tailored to allow interaction by means of multiple touch points for one passenger 526 or unique single touch points for multiple passengers. Touches on the gesture-sensing device 528 may be made by the passenger in the seat that the augmented safety restraint 520 is used with, or may be made by another person, such as by a parent adjusting parameters for their child.

Sensed touches or gestures can be used to control vehicle systems including vehicle features and amenities. The secured passenger 526 can tap, swipe, or gesture in a pre-defined manner either directly on or in the vicinity of the gesture-sensing device 528 in order to perform such vehicle functions as changing window height, seat position, radio volume, etc. The sensed touches or gestures can similarly be used to control or interact with vehicle-connected devices to perform functions such as answering or rejecting incoming phone calls or controlling a multimedia player.

Sensed touches or gestures can also be used to communicate with and interact with other passengers in the vehicle, for example, by using directed vibrating or haptic functionalities. In one example, the passenger 526 of FIG. 5 can touch the gesture-sensing device 528 on the augmented safety restraint 520 in order to create a vibration or "poke" another passenger at the same location on the other passenger's augmented safety restraint. The vibration or "poke" feature can also be used to gain passenger attention in cases when the passenger is distracted and there is an expected or unexpected event to be brought to the passenger's attention.

The gesture-sensing device 528 can also include or control vibration to complement a seat vibrating feature used for comfort or to complement other vehicle notification systems. The vibration feature can be integrated into the comfort related controls for the seat 518, allowing the passenger 526 to regulate the intensity and modality of the vibration. For example, the vibration can be programmed to be activated in predefined situations (e.g., at a certain time set by the passenger 526, in the proximity of a specified point of interest (POI) along the selected route of the passenger 526, etc.) or asynchronously (e.g., as a haptic warning based on drowsiness of the passenger 526, exceeding the speed limit, having a low fuel reserve, or any other warning associated with various vehicle parameters).

The vibrating functionality associated with the gesture-sensing device 528 can also be used to provide haptic feedback during passenger interactions with the vehicle (e.g., feedback for acknowledgment of inputs) and/or with other co-passengers (e.g., vibration at the same spot on another passenger's safety restraint when the passenger 526 pokes or swipes the augmented safety restraint 520 at the location of the gesture-sensing device 528). In addition to providing vibration using the gesture-sensing device 528, other vibrating devices can be used. For example, vibrating devices can be integrated into the anchor points or spread along the surfaces of the augmented safety restraint 520. When vibrating devices are spread along the surfaces of the augmented safety restraint 520, only the vibrating devices that are presently in contact with the passenger's body, for example, on the passenger-facing surface, are activated to provide vibration.

In some embodiments, the vibrating functionality can be personalized with different vibration patterns and strengths created by the user and stored in a user profile. The user may utilize, select, and/or create different patterns for different types of alerts such as a first alert type that corresponds to an incoming telephone call and a second alert type that corresponds to a notification from a vehicle system. Other types of alerts can be issued and custom patterns may be established for those alerts as well.

Figure 6:
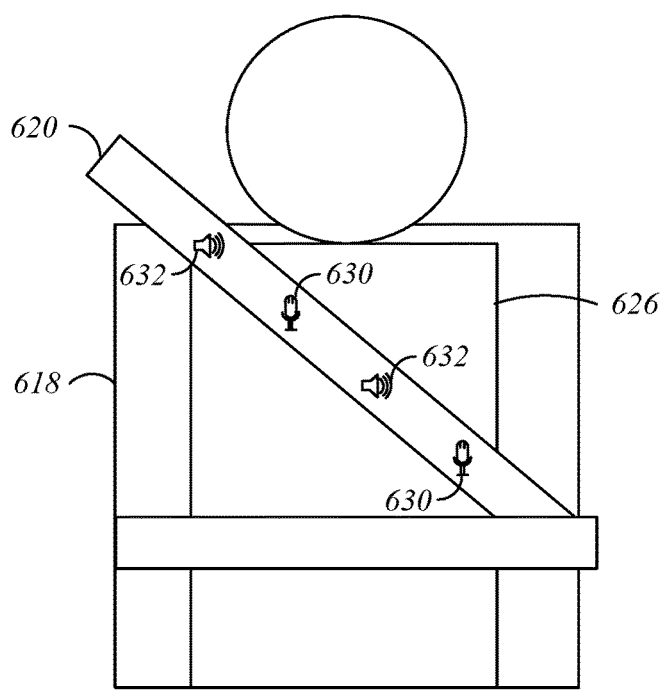
FIG. 6 shows audio communication features for an augmented safety restraint.

FIG. 6 shows audio communication features for an augmented safety restraint 620 that is attached to a seat 618 for use by a passenger 626. Noise (e.g., from vehicle operation, the radio, the external environment, other passengers talking, etc.) can impede communication within a vehicle. The quality of audio input/output signals can be improved using integrated audio capture and playback devices such as microphones 630 and speakers 632 based on the devices' proximity to the passenger's mouth and ears, respectively. Integrated microphones 630 may be used to monitor the passenger 626 for stress/emotional well-being based on tone of voice in addition to being able to enhance the quality of vocal commands conveyed to the vehicle and improving hands-free phone communications. Integrated speakers 632 can be used to direct phone- or vehicle-based communications to the passenger 626 in addition to directing audio from multimedia components to the passenger 626. The integrated microphones 630 and speakers 632 may also be used to improve intra-passenger communication, by capturing audio from a passenger who is speaking and playing that audio for a different passenger in the vehicle. This improvement to intra-passenger communication may be helpful when high levels of road noise make it difficult for passengers to hear one another. This improvement to intra-passenger communication may also be useful to allow persons with hearing impairments to hear other passengers. The integrated microphones 630 and speakers 632 may also be used to apply transformations to the voice recorded from one passenger, and the transformed voice recording is output at the speakers 632 near another passenger. This feature may be used when playing an interactive game or when telling a story by transforming the voice of the passenger to match the voice of a character. In some embodiments, the passenger 626 or another passenger may be able to control aspects of operation of the microphones 630 and speakers 632 using a user interface, such as by routing certain content to a particular passenger, or selectively muting the microphones 630 that are associated with certain passengers.

In one embodiment, an array of microphones 630 and speakers 632 can be integrated into the augmented safety restraint 620 with usage adapted according to the position of each microphone 630 or speaker 632 along the passenger's torso. For example, only the speakers 632 lying in the area of the passenger's shoulder can be activated in order to reproduce sound content directed at the passenger 626 from various sources (e.g., a phone call, music from the vehicle's entertainment system, navigation instructions, etc.), while the rest of speakers 632 are inactive.

Similarly, from the set of microphones 630 exposed to the passenger 626, only the microphones 630 in the area of the passenger's shoulder can be used to register the passenger's voice for various voice-based use cases (e.g., a phone call, voice commands to the vehicle, inter-passenger communications, etc.), while the rest of the microphones 630 along the torso and lap portions of the augmented safety restraint 620 can be used to measure the ambient noise for sound-balancing purposes (e.g., active noise cancelation, internal activities monitoring, etc.).

The set of microphones 630 and speakers 632 can be integrated into the material of the augmented safety restraint 620 during the manufacturing process and can be accessible on both sides of the augmented safety restraint 620 in order to be in close contact with the passenger 626 and the surrounding environment. In addition to providing a set of microphones 630 and speakers 632 that are integrated into the material of the augmented safety restraint 620, other microphones and speakers can be used. For example, microphones and/or speakers can be integrated into the anchor points or spread along the surfaces of the augmented safety restraint 620.

Figure 7:
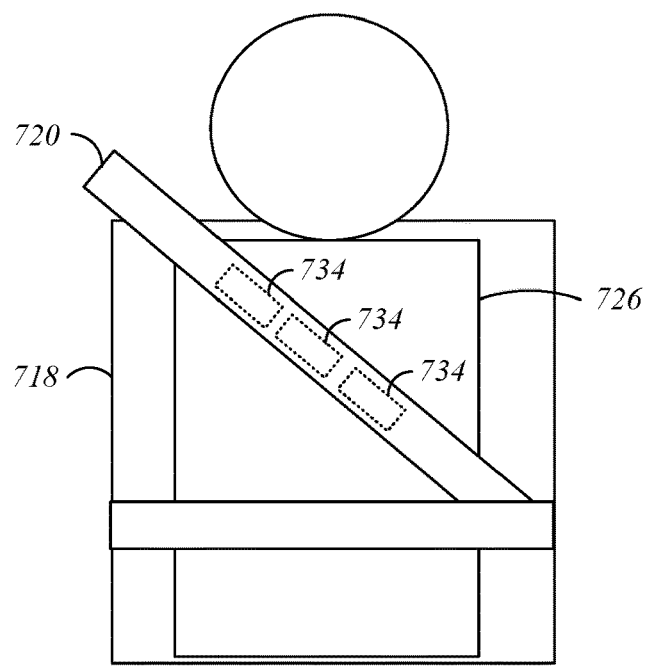
FIG. 7 shows a passenger-monitoring feature for an augmented safety restraint.

FIG. 7 shows a monitoring feature for an augmented safety restraint 720 that is attached to a seat 718 for use by a passenger 726. The augmented safety restraint 720 can include sensors 734 that are able to measure properties of the passenger 726 and/or the environment. In some embodiments, the sensors 734 are operable to measure the vital signs of the secured passenger 726 such as the passenger's heart rate, breathing rate, temperature, CO level, blood alcohol content, etc. This information can be used to document the passenger's health status, stress level, and emotional well-being for various purposes (e.g., diagnostic, research, investigations, etc.) and falls into the category of activities meant to monitor driver/passenger physical status.

The sensors 734 can be integrated into the material of the augmented safety restraint 720 during the manufacturing process and can be accessible on both sides of the augmented safety restraint 720 in order to be in close contact with the passenger 726 and the surrounding environment. Passenger status parameters such as heart rate, breathing rate, temperature, and air quality metrics related to passenger status (e.g., CO level, blood alcohol content, etc.) that are detected by the sensors 734 can be used in various monitoring scenarios. For example, one of the integrated sensors 734 can be a breathalyzer sensor configured to prevent the vehicle from starting if the passenger's blood alcohol content is above a predetermined threshold. In another example, the information captured by the sensors 734 can be used for forensic purposes.

In addition to the sensors 734, other sensors or devices equipped with sensors may be used. For example, sensors and/or devices equipped with sensors can be integrated into the anchor points or spread along the surfaces of the augmented safety restraint 720.

Figure 8:
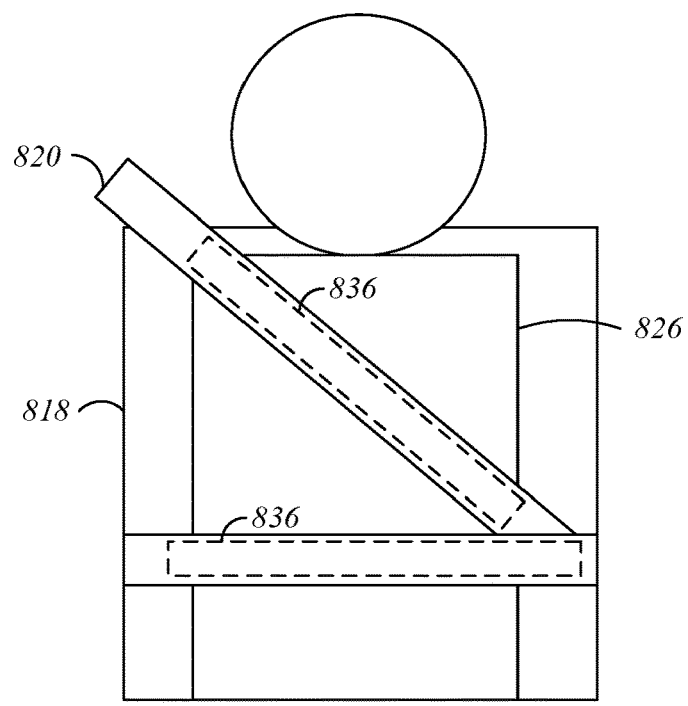
FIG. 8 shows a passenger-comfort feature for an augmented safety restraint.

FIG. 8 shows a passenger-comfort feature for an augmented safety restraint 820. The augmented safety restraint 820 is shown as securing a passenger 826 to a seat 818. The augmented safety restraint 820 can include thermal functionality which, complementing the seat heating or cooling, can increase passenger comfort in both hot and cold conditions. For example, heating/cooling devices 836 are integrated within the manufacturing material and along the length of the augmented safety restraint 820. In another example, the exposed heating/cooling devices 836 can be activated to warm or cool the passenger 826, for example, in conjunction with the heating/cooling functionality of the seat 818. In some embodiments, user settings and preferences (e.g., preferred temperature, preferred seat settings) can be loaded from a user profile after identifying the user.

In another example, the heating/cooling devices 836 in contact with the torso and lap of the passenger 826 can be automatically activated in cases where the sensors 734 of FIG. 7 indicate that the body temperature of the passenger 826 is lower than or higher than a predetermined temperature threshold such that the passenger 826 would be uncomfortable. In another example, the passenger 826 can program the augmented safety restraint 820 such that the heating/cooling devices 836 activate based on the external temperature outside the vehicle.

Figure 9:
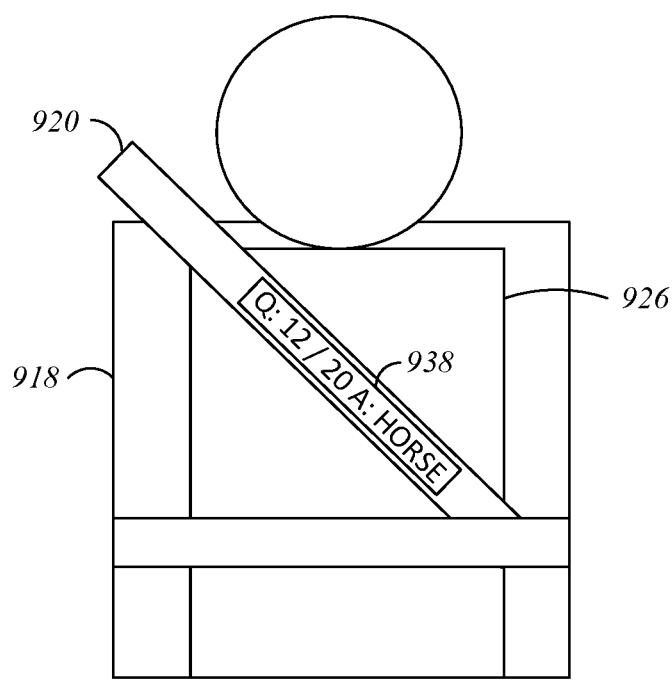
FIG. 9 shows a display feature for an augmented safety restraint.

FIG. 9 shows a display feature for an augmented safety restraint 920 that is attached to a seat 918 for use by a passenger 926. The integration of a display 938 allows both passenger-vehicle and passenger-passenger interaction as the display 938 can provide entertainment, aesthetic functionality, and security features. The display 938 can be applied to or integrated into the exposed surface of the augmented safety restraint 920 and activated only on the portion of the augmented safety restraint 920 that extends along the body of the passenger 926.

The display 938 can be implemented by means of LED, liquid crystal, plasma panels, or an OLED layer applied to the exposed surface of the augmented safety restraint 820, or any other display devices that are currently known and display devices that may be developed in the future. The content available on the display 938 can be accessed by a user interface (not shown) that allows the passenger 926 to select one of the functionalities and control it by, for example, touch or multi-touch capabilities. Additionally, vibrating or other haptic feedback may be provided by other features of the augmented safety restraint 820 during interaction with the display 938.

In addition to the display 938, other displays or devices equipped with displays (e.g., smartphones, music players) can be used. For example, displays and/or devices equipped with displays can be integrated into the anchor points or spread along the surfaces of the augmented safety restraint 920. In an example, the content of the user interface of a device equipped with a display can be extended onto the display 938.

The content to be displayed on the augmented safety restraint 820 can be configured by the passenger 926, based on a profile associated with the passenger 926, or matched to the activated function selected by the passenger 926. For example, the displayed content can be selected based on the user profile for the passenger 926. The user profile can be associated with a device, such as a smartphone, carried by or in close proximity to the passenger 926, or the passenger 926 can be identified by recognition methods (e.g., visual face recognition). A user profile for the passenger 926 that is stored within the computing device 100 of FIG. 1 can also be used to display passenger-specific content.

In the example shown in FIG. 9, the display 938 is showing the current status of a multi-passenger game. In this common game, "20 Questions," the passenger 926 secured by the augmented safety restraint 920 is attempting to guess a word displayed on the augmented safety restraint 920 to the other passengers within the vehicle. The word is indicated by the text "A: HORSE" on the augmented safety restraint 920. The passenger 926 has already asked the other passengers twelve out of the allowed twenty questions in an attempt to guess the word, as indicated by the text "Q: 12/20" shown on the display 938.

In another example, the display 938 can be used for entertainment and educational purposes to identify the body parts or show the internal organs of the passenger 926 beneath the area of the passenger's body covered by the augmented safety restraint 920. In this embodiment, the shown content may be augmented with the name of the body part (e.g., leg, torso, shoulder, etc.) or the name of the organs (e.g., lungs, stomach, heart, etc.) and dynamically adapted when the belt is moved around the passenger's body.

In another example, the display 938 can operate in a fashion mode where the augmented safety restraint 920 displays the colors of the passenger's clothing or a design (e.g., a color, a pattern, or an image) that coordinates with the passenger's clothing (e.g., by choosing a complementary color, pattern, or image that highlights the passenger's clothing).

The display 938 can also be used for inter-passenger communication purposes. For example, the display 938 can be used to communicate the current state of the secured passenger 926 to other passengers within the vehicle. The current state of the passenger 926 can be selectable by the passenger 926 or automatically generated using, for example, the sensors 734 of FIG. 7. The current state can be indicated by text displayed along the exposed surface of the augmented safety restraint 920. Example text includes "sleeping, do not disturb," "available, free to chat," "listening to music," etc.

In another embodiment, the augmented safety restraint 920 can indicate the current state of the passenger 926 by displaying animations or icons instead of text. For example, an equalizer animation can be shown on the display 938 when the passenger 926 is listening to music, thereby suggesting to other passengers that the passenger 926 may not be able to hear any attempts to start a conversation. Similarly, a cartoon showing a snoring character can be shown on the display 938 if the passenger 926 is sleeping, again suggesting that the passenger 926 not be disturbed.

The display 938 can also be leveraged to implement safety features. For example, the display 938 can show an animation inviting the passenger 926, or another passenger in the case when the passenger 926 is a minor, to secure the augmented safety restraint 920 if the passenger 926 has not yet been secured in the seat 918. In another embodiment, the content on the display 938 can be modified depending on whether the passenger 926 has secured the augmented safety restraint 920. In another safety feature, the augmented safety restraint 920 can be designed to flash, blink, or project bright colors with high visibility to assist in locating the passenger 926. Finally, the display 938 can be configured to work in conjunction with other components, such as the sensors 734 of FIG. 7, to display information such as vital signs of the passenger 926.

The display 938 can also be used to implement communications features. As one example, the augmented safety restraint 920 may be configured to detect when the passenger 926 is speaking and output a visual indication on the display 938 that indicates that the passenger 926 is speaking. The visual indication may be, as examples, a color or an icon. Instead of a color or an icon, the words spoken by the passenger 926 may be output on the display 938 so that they can be read by other passengers in the vehicle. The words spoken by the passenger 926 may be converted to text using a speech-to-text algorithm. These functions may be usable, for example, by persons who are hearing impaired, to allow them to communicate more effectively with other persons in the vehicle. In addition, the words spoken by the passenger 926 may be translated to a different language after being converted to text using the speech to text algorithm. This function may be useful to translate the text into a language understood by a different passenger in the vehicle when that passenger does not understand the spoken language.

The display 938 may also be used to assist in passenger ingress. When the passenger 926 ingresses, the vehicle may assign a seat to the passenger 926. The display 938 is used to provide a visual indication to the passenger 926 as to which seat the passenger 926 is to be seated in. The display 938 in the safety restraint of the assigned seat may display, as examples, a pattern, an icon, a color, or text to inform the passenger 926 that the seat is assigned to him or her. This can be used for a number of reasons, such as to control the order of passenger egress. The display 938 may also be used to help place items within the vehicle, such as large parcels or backpacks. The vehicle may assign a seat to the item, and the display 938 is used to provide a visual indication to the passenger as to where the item is to be placed and, optionally, how the item should be placed. In one embodiment, the item is a child safety seat, and the vehicle may assign a seat to the child safety seat. The display 938 is used to provide a visual indication to the passenger as to where the child safety seat is to be installed. The display 938 may also be used to show instructions for installing and buckling the child safety seat.

Figure 10:
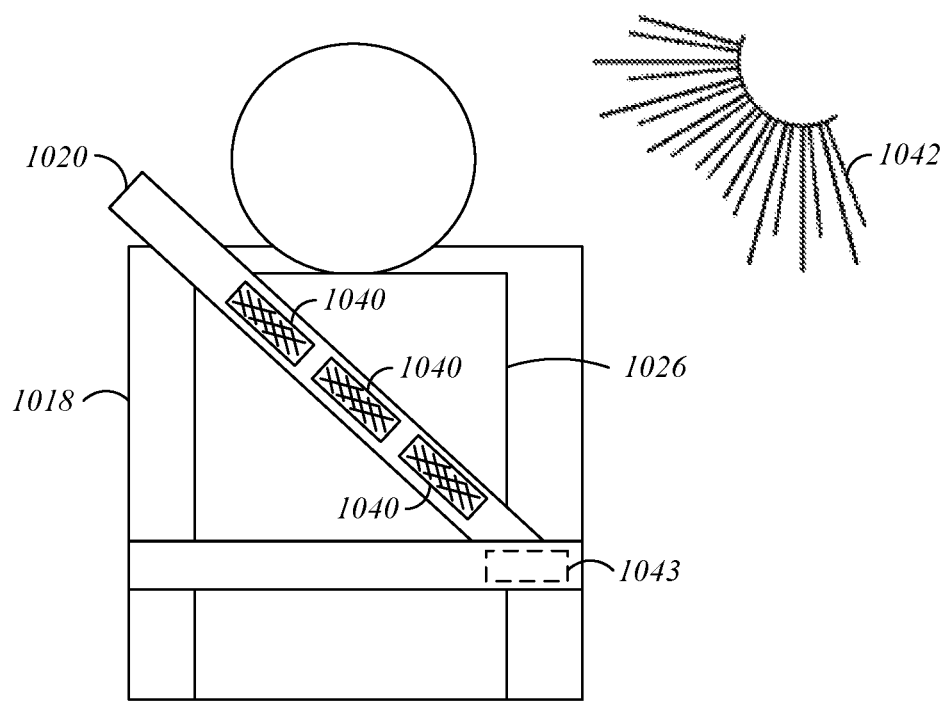
FIG. 10 shows an energy-generation feature for an augmented safety restraint.

FIG. 10 shows an energy-generation feature for an augmented safety restraint 1020 that is attached to a seat 1018 for use by a passenger 1026. The augmented safety restraint 1020 can include, for example, photoelectric capability in the form of energy-producing devices such as photovoltaic devices 1040. The photovoltaic devices 1040 can be exposed to the sun 1042 when the vehicle is either stored or operated outside. The photovoltaic devices 1040 allow for the production of energy in order to power the various features of the augmented safety restraint 1020. In some embodiments, electrical energy produced by the photovoltaic devices 1040 is stored in a battery 1043 that is integrated into or associated with the augmented safety restraint 1020 for later use by the components of the augmented safety restraint. In some embodiments, a surplus of energy, i.e., energy beyond what is necessary to power the various features of the augmented safety restraint 1020, can contribute to the energy store for the vehicle, for example, the vehicle battery. The energy-generation feature can have a positive impact on the vehicle's energy efficiency (due to the null impact on the vehicle battery during the daytime) and, consequently, on the environment.

The above-described features and the resulting functionalities may be activated in the presence of a secured passenger or, with respect to some features and functionalities, may be activated when a passenger is not present such as, for example, aiding passenger ingress or transporting packages. In various embodiments, the features and functionalities are achieved with the joint use of two or more of the proposed augmented safety restraints. Various embodiments may include variations in the shape, material, construction method, and size of the augmented safety restraint as well as the proposed sensors and devices to be integrated into the augmented safety restraint. Various embodiments can also allow for variations in the design of the electronic components and connections between the augmented safety restraint, the passengers, and/or the vehicle.

What is claimed is:

1. An augmented safety restraint system, comprising:
    a first seat;
    a first restraint operable to secure a first passenger to the first seat, the first restraint having an exposed surface facing away from a body of the first passenger; and
    a gesture-sensing device integrated into a material of the first restraint and operable to receive an input from the first passenger on the exposed surface of the first restraint facing away from the body of the first passenger.

2. The augmented safety restraint system of claim 1, further comprising:
    a vehicle system, wherein, in response to the input from the first passenger, a command is sent to the vehicle system.

3. The augmented safety restraint system of claim 1, further comprising:
    an electronic device that is integrated into the first restraint, wherein, in response to the input from the first passenger, a command is sent to the electronic device.

4. The augmented safety restraint system of claim 1, further comprising:
    an external electronic device that is separate from the first restraint and is connected to the gesture-sensing device by one of a wired connection or a wireless connection, wherein, in response to the input from the first passenger, a command is sent to the external electronic device.

5. The augmented safety restraint system of claim 1, further comprising:
    a light emitting device for illuminating an area adjacent to the first restraint, wherein, in response to the input from the first passenger, a command is sent to the light emitting device.

6. The augmented safety restraint system of claim 1, further comprising:
    an energy-producing device disposed on the exposed surface of the first restraint, wherein the energy-producing device provides energy to the gesture-sensing device.

7. The augmented safety restraint system of claim 1, further comprising:
    a display disposed on the exposed surface of the first restraint, wherein, in response to the input from the first passenger, a command is sent to the display.

8. The augmented safety restraint system of claim 1, further comprising:
    a haptic feedback device that is integrated into the first restraint to cause a vibration of the first restraint in response to a command from a vehicle notification system.

9. The augmented safety restraint system of claim 8, wherein at least one of a vibration pattern or a vibration strength for the haptic feedback device is obtained from a user profile for the first passenger.

10. The augmented safety restraint system of claim 1, further comprising:
    a second restraint operable to secure a second passenger; and
    a haptic feedback device that is integrated into the second restraint, wherein, in response to the input from the first passenger, a command is sent to the haptic feedback device in the second restraint to cause the haptic feedback device to cause a vibration of the second restraint.

11. The augmented safety restraint system of claim 10, wherein the input from the first passenger is made at a gesture location on the gesture-sensing device of the first restraint, and the haptic feedback device causes the vibration at a feedback location on the second restraint that is selected to correspond to the gesture location.

12. The augmented safety restraint system of claim 1, further comprising:
    a climate control system, wherein, in response to the input from the first passenger, a command is sent to the climate control system.

13. The augmented safety restraint system of claim 1, further comprising:
    a telephone system, wherein, in response to the input from the first passenger, a command is sent to the telephone system.

14. The augmented safety restraint system of claim 1, further comprising:
    a navigation system, wherein, in response to the input from the first passenger, a command is sent to the navigation system.

15. The augmented safety restraint system of claim 14, wherein the command sets a desired destination for the navigation system.

16. An augmented safety restraint system, comprising:
    a first seat;
    a first seat restraint operable to secure a first passenger to the first seat, the first restraint having an exposed surface facing away from a body of the first passenger;
    a gesture-sensing device disposed on the exposed surface of the first restraint and operable to receive an input from the first passenger; and
    an autonomous vehicle control system, wherein, in response to the input from the first passenger, a command is sent to the autonomous vehicle control system.

17. The augmented safety restraint system of claim 16, wherein the command sets a desired destination for the autonomous vehicle control system.

18. The augmented safety restraint system of claim 1, further comprising:
    an external vehicle-connected device, wherein, in response to the input from the first passenger, a command is sent to the external vehicle-connected device.

19. The augmented safety restraint system of claim 18, wherein the external vehicle-connected device is a home automation device.

20. An augmented safety restraint system, comprising:
a first restraint operable to secure a first passenger, the first restraint having an exposed surface facing away from a body of the first passenger;
a gesture-sensing device disposed on the exposed surface of the first restraint and operable to receive an input from the first passenger;
a second restraint operable to secure a second passenger; and
an electronic device that is integrated into the second restraint, wherein, in response to the input from the first passenger, a command is sent to the electronic device in the second restraint.

\* \* \* \* \*